United States Patent

[11] 3,547,454

| | | |
|---|---|---|
| [72] | Inventor | Milton L. Benjamin<br>Moreland Hills, Ohio |
| [21] | Appl. No. | 752,386 |
| [22] | Filed | Aug. 13, 1968 |
| [45] | Patented | Dec. 15, 1970 |
| [73] | Assignee | Erickson Tool Company<br>a corporation of Ohio |

[54] SELF-TIGHTENING TOOLHOLDER
14 Claims, 4 Drawing Figs.

| | | |
|---|---|---|
| [52] | U.S. Cl. | 279/47 |
| [51] | Int. Cl. | B23b 31/02 |
| [50] | Field of Search | 279/1(S), 43, 47, 7, 99 |

[56] References Cited
UNITED STATES PATENTS

| | | | |
|---|---|---|---|
| 3,028,168 | 4/1962 | Hughes | 279/47X |
| 3,035,845 | 5/1962 | Benjamin | 279/47 |

*Primary Examiner*—Lester M. Swingle
*Assistant Examiner*—Donald D. Evenson
*Attorney*—Woodling, Krost, Granger and Rust ABSTRACT: A toolholder is disclosed wherein a body is provided with a bore to receive a tool such as a drill or a milling cutter which has a threaded internal end with a right-hand thread. This thread fits into a first nut which is restrained against rotation relative to the holder body but may move longitudinally and as it moves longitudinally forwardly toward the nose of the holder it axially compresses a collet against an abutment to inwardly collapse the collet to grip the tool. The tool is used in a right-hand application so that should the tool slip in the collet it will thread into the first nut to tighten the collet still further. A conical center is adjusted by a lock screw to tightly engage and axially position the end mill or other tool and the lock screw has a left-hand thread whereby if the tool slips in the collet, the friction of the end mill with the conical center may rotate this center and the left-hand lock screw to move the center forwardly to also further tighten the collet. The foregoing abstract is merely a resume of one general application, is not a complete discussion of all principles of operation or applications, and is not to be construed as a limitation on the scope of the claimed subject matter.

PATENTED DEC 15 1970

3,547,454

INVENTOR.
MILTON L. BENJAMIN
BY Woodling, Krost,
Granger and Rust
ATTORNEYS.

SELF-TIGHTENING TOOLHOLDER

BACKGROUND OF THE INVENTION

The prior art has known many different forms of toolholders, but many have the deficiencies that where a cylindrical shank tool is being held in a collet or chuck, this tool is subject to rotary slippage relative to this collet by having the tool jam in the workpiece and become stationary while the toolholder continues to rotate or to rotate with the workpiece while the toolholder remains stationary. Once this rotary slippage occurs it will continue because the sliding friction is less than the static friction. In some forms of the prior art the toolholder for a cylindrical shank tool would accept a tool which had a threaded end to lock it into the toolholder, but no provision was made to tighten the collet or chuck in the toolholder upon the cylinder tool shank upon slippage and thus once slippage occurred it would not normally be stopped. In other forms of the prior art toolholders for tools with a threaded end on a cylindrical shank, there was a provision for tightening of the collet or chuck upon rotary slippage of the tool or relative to the toolholder, but there was no provision for axial adjustment of the tool relative to the toolholder. With numerical control of machine tools and tool changers becoming more prevalent, and for rapid machining of a workpiece it is imperative that the tools be preset as to axial length in the individual toolholders, so that as the toolholders are changed by the tool changer mechanism, each succeeding tool will machine to a predetermined depth without having to individually set up the machine for each new tool. The tool is axially preset in the toolholder in a gauge fixture to a close tolerance, for example, 0.001 inches or even less, so that when that particular tool and toolholder are placed in the machine tool by the tool changer mechanism, the workpiece will be precisely machined.

In other prior art devices wherein the tool is axially adjustable relative to the toolholder it has been extremely difficult to precisely judge this axial position and have the tool effectively locked in the toolholder so that if rotary slippage should later occur it will not upset this precise axial adjustment.

Accordingly an object of the invention is to provide a toolholder which is self-tightening should rotary slippage occur.

Another object of the invention is to provide a toolholder to accommodate a cylindrical shank tool with a threaded end so that the end of the tool threads into a nut and is movable relative thereto for self-tightening.

Another object of the invention is to provide a self-tightening toolholder which is axially adjustable.

Another object of the invention is to provide a self-tightening toolholder which is tightenable by two different modes for positive gripping of the tool.

Another object of the invention is to provide a toolholder which is axially adjustable for precise axially setting of the tool which is especially adaptable for use with an end mill as the tool.

Other objects and a fuller understanding of the invention may be had by referring to the following description and claims, taken in conjunction with the accompanying drawings.

PREFERRED EMBODIMENT OF THE INVENTION

Figure 1:
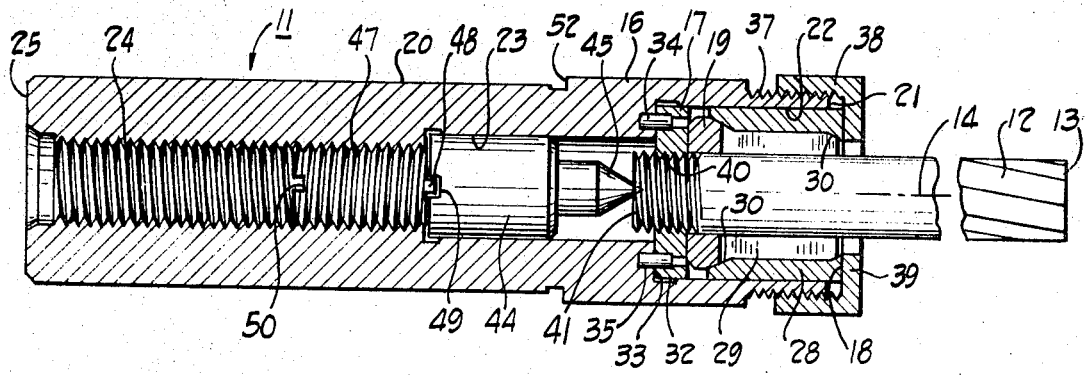
FIG. 1 is a longitudinal sectional view of a toolholder embodying the invention.
Figure 2:
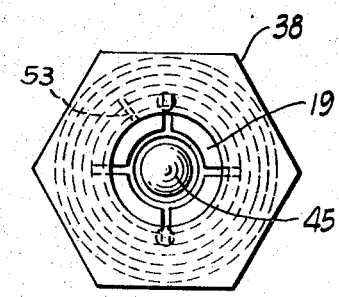
FIG. 2 is a front end view of the toolholder of FIG. 1 with the tool removed.

The FIGS. 1 and 2 show the preferred embodiment of the invention but it will be readily understood by those skilled in the art that this preferred embodiment is only by way of example and is not to be taken as limiting, the limitations on the invention being set forth only in the hereinafter appended claims.

The FIGS. 1 and 2 show a toolholder 11 adapted to hold a tool 12. This tool may be one of many forms such as a drill or milling cutter and in this case has been illustrated as an end mill having a flat end 13 perpendicular to the axis 14 of the tool and toolholder. The toolholder 11 includes generally a body 16, a first nut 17, a collet abutment 18 and a collet 19. The toolholder body 16 may take many forms, it may have a cylindrical shank 20 as shown for mounting in the spindle of a machine tool such as a milling machine, or it may have a tapered shank or a flange mounting, for example. The body 16 has a first end 21 and a coaxial cylindrical first bore 22 enters from this first end 21. A reduced diameter second bore 23 is coaxial with the first bore 22 and a third bore is tapped at 24 and extends to the rearward or second end 25 of the body 16. In this preferred embodiment the collet 19 is closely disposed within a collet sleeve 28 which in turn is closely received in the first bore 22. The collet 19 may be made from one piece with longitudinal slots 29 extending alternately from opposite ends of this collet 19 to provide the necessary radially inward collapsibility of this collet 19. Other means may be provided for establishing the generally radially inward collapsibility of this collet 19, in order to act as a collet or chuck to grip the shank of the tool 12. In this specification, the use of the term collet will embrace any form of collet or chuck which will be generally radially moved to grip a tool 12. In this preferred embodiment, both the collet 19 and the collet sleeve 28 have double conical angles of the same angle relative to the axis 14, with these two angular faces at opposite ends of the collet and sleeve, so that as the collet and sleeve are longitudinally moved toward each other the collet 19 is radially collapsed.

The first nut 17 has a circular outer periphery 32 which is closely received in the first bore 22 and the rear face of this nut 17 is limited in axial inward movement by abutment against a radial shoulder 33 joining the first and second bores 22 and 23. Axially parallel pins 34, for example two in number, are fixed in the first nut 17 and are slidably received in longitudinal bore apertures 35 in this radial shoulder 33 of the body 16. These pins 34 keep the nut 17 from turning relative to the body 16 yet permit slight longitudinal movement of this nut 17 from turning relative to the body 16. External threads 37 are provided on the first end 21 of the body 16 to receive a second nut or nosepiece nut 38. This nut 38 has an inturned flange 39 which forms the abutment 18. The first nut 17 has internal threads 40 to threadably receive the threaded inner end of 41 of the tool 12. This is a right-hand thread for the usual tool which is rotated in a right-hand or clockwise direction by the toolholder 11 during use. Accordingly as the tool holder 11 is rotated in a right-hand direction, any resistance to movement of the tool 12 will result in the tool screwing into the nut 17.

A cylindrical plug 44 preferably has a ground outer surface to be closely and accurately received in the second bore 23. This cylindrical plug 44 carries at the forward end thereof a conical center 45 to receive the conical central depression on the inner end of the tool 12. Many such tools 12 have such a conical central depression which is often established in order to hold the tool to concentrically form the shank and the flutes on the tool 12. An adjusting screw or lock screw 47 has a left-hand thread thereon and is threaded into the left-hand thread of the tapped third bore 24. This lock screw 47 has a blade 48 to enter a slot 49 in the cylindrical plug 44 for positive rotational interconnection. The lock screw 47 also has a screwdriver slot 50 so that this lock screw 47 may be adjusted in position by a tool such as a screwdriver inserted through the bore 24 from the second end 25 of the body 16.

OPERATION

The toolholder 11 is used to hold the tool 12 which may be one of many different tools, an end mill being illustrated. In many uses of the toolholder 11 it is important that the axial position of the end mill 12 be precisely established before the toolholder 11 is used. This is often the case in numerical control and especially in tool changer mechanisms wherein a plurality of toolholders 11 are alternatively used in the machine tool for different machining operations on a workpiece. In such case the numerical control of the machine tool is preset by some program device such as punched paper tape to feed the spindle of the machine tool downwardly toward the workpiece a precise distance. Accordingly, it is important that the axial position of the end face 13 be established relative to a gauge surface 52, for example, on the toolholder 11 so that prior to use of the tool the actual depth that the end mill 12 will cut will be established. To accomplish this presetting, the toolholder 11 is usually placed in a gauging fixture so that the operator may accurately gauge and adjust the position of the end face 13 relative to the gauge surface 52. For different diameters of tools 12, different first nuts 17 are provided as well as different collets 19, collet sleeves 28 and nose piece nuts 38. The proper sizes being selected, the end mill 12 is threaded into the first nut 17 and the other parts assembled onto the body 16. The nosepiece nut 38 would be tightened sufficiently to centrally locate the end mill 12, but not enough to clamp it tightly. The end mill 12 would be threaded into the first nut 17 to the approximate axial position. Next, the lock screw 47 would be rotated by a screwdriver entering through the rear of the toolholder body 16 until the cylindrical plug 44 and conical center 45 abutted the end of the end mill 12. Then the end mill 12 and lock screw 47 could be further slightly adjusted for precise axial positioning of this end mill 12, then the lock screw 47 would be tightened in place and lastly the nosepiece nut 38 would be tightened with a tool such as a wrench to firmly clamp the collet 19 onto this end mill 12. In this condition the toolholder with the assembled tool 12 would be ready for use in the machine tool and would be precisely axially positioned.

The collet sleeve 28 in this preferred embodiment has a single longitudinal slit 53 so that it is not annular. This permits this sleeve 28 to expand slightly as the nuts 17 or 38 are tightened and the collet 19 contracts on the tool 12. This results in a metal-to-metal contact of tool 12, collet 19, sleeve 28 and body 16, establishing a solid full-length support of the tool 12 to eliminate any weave or wobble of such tool. This is extremely important in precision work. Further the longitudinal slit 53 prevents the collet sleeve 28 from jamming in the bore 22 and permits easy removal to change tool sizes.

Figure 3:
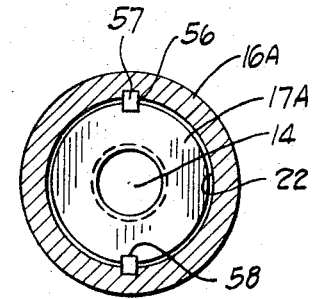
FIG. 3 is a partial view of a modification.

FIG. 3 shows a modification wherein the body 16A has slots 56 parallel to the axis 14. These slots are in the bore 22 and receive keys 57. A first nut 17A is used which has slots 58. In this modification the first nut 17A may slide axially on the keys 57 yet the first nut 17A is held against rotation.

Figure 4:
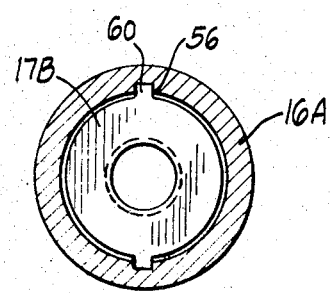
FIG. 4 is a similar partial view of a second modification.

FIG. 4 shows a second modification of the body 16A again having the slots 56 which in this case receive tongues 60 extending from a first nut 17B. These tongues 60 may slide in the slots 56 to prevent rotation of the first nut 17B yet to permit axial movement thereof. Both of these modifications of FIGS. 3 and 4 are alternatives to the preferred embodiment of FIG. 1 wherein the slight axial movement yet nonrotative connection is provided between the body 16 and first nut 17 by means of the axial pins 34.

In many applications of the end mill 12, it is inserted into a bore to clean out the end of the bore after having been drilled by a conical end drill. In such case the helical flutes of the end mill 12 are in engagement with the cylindrical side of the hole and thus the rotation of this end mill 12 tends to pull the end mill axially into the hole and hence axially out of the toolholder 11. The threaded connection 40—41 of the end mill with the toolholder 11 prevents the tool 12 from being pulled out of the toolholder 11. Also many such tooling or machining operations such as that described above may tend to jam the end mill 12 relative to the workpiece and this exerts a considerably greater than normal torque on the end mill. This suddenly increased torque may tend to make the end mill 12 slip rotatively relative to the toolholder 11. If this should happen, the toolholder 12 will rotate in a right-hand direction relative to the toolholder 11 and this will screw the threads 41 into the threads 40 of the first nut 17. This pulls the first nut 17 axially forwardly toward the abutment 18 which axially collapses the collet and collet sleeve 28 and of course radially inwardly collapses the collet 19. This effects an immediate tightening of this collet 19 to rotatively grip the end mill 12 even tighter. This self-tightening feature has been found extremely valuable because in a normal prior art tool and toolholder, once rotational slippage occurs this slippage usually continues, because the sliding friction is less than the static friction. Also it will be noticed that this self-tightening feature does not change the axial dimension between the tool end face 13 and the gauge surface 52, because the nut 17 moves forwardly, rather than the end mill 12 moving rearwardly.

The self-tightening toolholder 11 has another feature; namely, if rotational slippage of the end mill 12 relative to the toolholder 11 should occur, then the engagement between the end mill 12 and the conical center 45 will help to tighten this collet 19. This engagement is a frictional engagement at these two conical surfaces. This frictional engagement will tend to make the conical center 45, and of course the cylindrical plug 44 and lock screw 47, rotate in a clockwise direction, as viewed in FIG. 2. This clockwise rotation, coupled with the left-hand thread of the lock screw 47, will move the lock screw 47 forwardly toward the abutment 18. This forward movement moves the cylindrical plug 44, the conical center 45 and the end mill 12 together with the first nut 17 in a forward direction. If the end mill should slip in the collet, it is self-tightening in two different manners; namely, by threading itself by the first nut to pull the first nut forwardly to tighten the collet 19, and the second manner is that rotational friction with the center 45 rotates the center and the left-hand lock screw 47 to move the first nut 17 forwardly to tighten the collet 19. In both of these modes of operation the end mill 12 does not move rearwardly, as was the case in some prior art toolholders. The conical center 45 is mounted on the cylindrical plug 44 which is ground to closely fit the second bore 23. By this means the conical center 45 accurately centers the rear end of the end mill 12 so that there is no weave of this end mill as the spindle of the machine tool rotates. There is a connection between the end mill 12 and the conical center 45, and in this case it is a frictional engagement which may tend to rotate the lock screw 47 should the end mill 12 slip rotatively in the collet 19.

The toolholder 11 of the present invention permits one which is axially adjustable to accurately adjust the position of the end face 13 so that the end mill 12 may be preset in a gauging fixture. Also where severe conditions of use are encountered and the end mill 12 tends to slip, this toolholder 11 is self-tightening by two different modes of operation to eliminate such slippage.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A toolholder comprising, in combination:
a body having an axis and an axial bore entering from one end thereof;
a collet collapsible generally radially inwards disposed inside the bore a grip a tool for operating on a workpiece;
a collet abutment on the body having a portion acting on the collet to inwardly collapse the collet against a tool therein upon axial forward movement of the inward end of the collet toward the abutment;
a central abutment disposed in the bore and adapted to abut the inner end of a tool received in the bore;
a coaxially threaded aperture in the other end of the body and having a hand opposite that of the relative rotation of a tool and a workpiece;
and a lock screw threaded in the threaded aperture and rotatively interconnected with the central abutment; and said lock screw being accessible from said other end of said body, whereby if the tool should slip in the collet the friction with the central abutment can rotate the central abutment and the lock screw to move the central abutment forwardly to tighten the collet.

2. A toolholder as set forth in claim 1 wherein said tool is an end mill having flutes thereon tending to pull the tool from the toolholder under certain conditions of use.

3. A toolholder as set forth in claim 1 wherein said first bore is cylindrical, a collet sleeve disposed in said bore; and said radially collapsible collet being disposed inside said sleeve.

4. A toolholder as set forth in claim 1 wherein said collet abutment includes a threaded connection to said body, and said threaded connection being variable to tighten said collet.

5. A toolholder according to claim 1 including:
a first nut received in the bore for engaging the threaded end of a tool;
cooperating means on the nut and the body to permit limited axial movement of the nut relative to the body and restrain the nut from rotation relative to the body; and
the nut having threads of the same hand as the relative rotational direction of the tool and workpiece during use, whereby if a tool and collet should relatively rotatively slip, the collet will be tightened by the tool threading into the nut to pull the same axially forwardly toward the inward end of the collet and toward the collet abutment.

6. A toolholder as set forth in claim 5 wherein said collet abutment includes:
a second nut;
external threads on said one end of said body; and
said second nut being threaded on said external threads and having a portion acting on said collet.

7. A toolholder as set forth in claim 1 wherein said central abutment is a conical center to abut and center the inner end of any said tool.

8. A toolholder as set forth in claim 5 wherein said lock screw may be rotated to axially adjust the position of said central abutment with said first nut moving axially to adjust the axial position of any said tool relative to said toolholder.

9. A toolholder as set forth in claim 5 wherein said cooperating means includes key means acting between said first nut and said body.

10. A toolholder as set forth in claim 9 including axial pins received in the said first nut and extending into axial apertures in said body.

11. A toolholder as set forth in claim 9 including a radially inward slot in said first nut embracing an axial key in said body.

12. A toolholder as set forth in claim 9 including lugs extending radially from said first nut and entering axial keyway slots in said body.

13. A toolholder as set forth in claim 5 wherein said first nut is separate from said collet.

14. A toolholder as set forth in claim 5 wherein said tool is a milling cutter having right-hand spiral flutes for operation in a right-hand direction, and said first nut having right-hand threads.